May 29, 1934.  H. F. BERG  1,960,570
LOG TOWING DEVICE
Filed June 26, 1933

Hilmer Fred Berg
Inventor.

Patented May 29, 1934

1,960,570

UNITED STATES PATENT OFFICE 1,960,570

LOG TOWING DEVICE

Hilmer Fred Berg, Port Angeles, Wash.

Application June 26, 1933, Serial No. 677,608

3 Claims. (Cl. 9—15)

The present invention relates to methods and means for towing and otherwise transporting logs and the like and while a salient feature resides in an improved dog suitable for a variety of allied purposes the invention is more particularly described herein as relating to the art of towing logs particularly in the form of a raft. Also while designed particularly to meet towing conditions at sea the invention will be found to apply equally well to towing in shallow water as well as to the salvage of logs from a beach or open water.

A wide variety of rafts and like assemblies are known and practiced and it will be apparent hereinafter that my improved dog has advantages in any condition where a wide variety of strains are imposed upon a log and upon the cable or tow to which the log is secured. Such conditions are now well understood and in the ensuing disclosure the invention will be treated more particularly as it applies to towing logs in rafts, and again more particularly in the form of a raft which, while the more important features thereof have been known heretofore has had many shortcomings prior to this invention.

One of the primary objects of this invention is the provision of an improved dog with conditions such as the following in view:—Long life and long stormy trips; tensile strength; low cost of making-up and later breaking-up a raft; resistance to all manner of forces imposed upon it and the raft; reduced cost of salvaging from a beach or from open water after parting of lines, collision or the like; minimized wear on cables; minimum spoiled lumber due to unduly large holes ordinarily bored in logs; proper resolution of forces particularly in choppy, cross or following seas; practicability of forming rafts directly on the beach if required; distribution of forces in a raft whereby each dog is subject to the strains imposed by the corresponding log only; insurance against dislodgment of the dog in long or stormy trips; ease of securing dog to log and log to cable; ease of intentional removal; and a design of dog whereby sudden and destructive forces are snubbed in such manner that the dog will resist strains greater than any one part thereof will ordinarily resist.

Another important object of the invention is the provision of a raft or towing method in which total operating cost under all, and particularly under adverse conditions, is reduced.

Of course the knowledge and experience of those skilled in this art does not require particular comment on the disadvantages of present systems, rafts, cribs, dogs, and the like, particularly since a description of my improved dog and of one highly successful form of raft, made possible with the use of this dog, will enable those skilled in this art to at once appreciate the advantages of, and the better practice now made possible by, my invention, and will suggest to their minds other ways for applying my invention to the economical and efficient transportation of logs.

Rather than cite the more specific objects and advantages of the invention at this time they are particularly brought out in the ensuing description, and at points where they are most readily understood, of one practical embodiment of my invention in the form of a practical dog and a practical raft.

Same are illustrated by the accompanying drawing in which.

Figure 1:
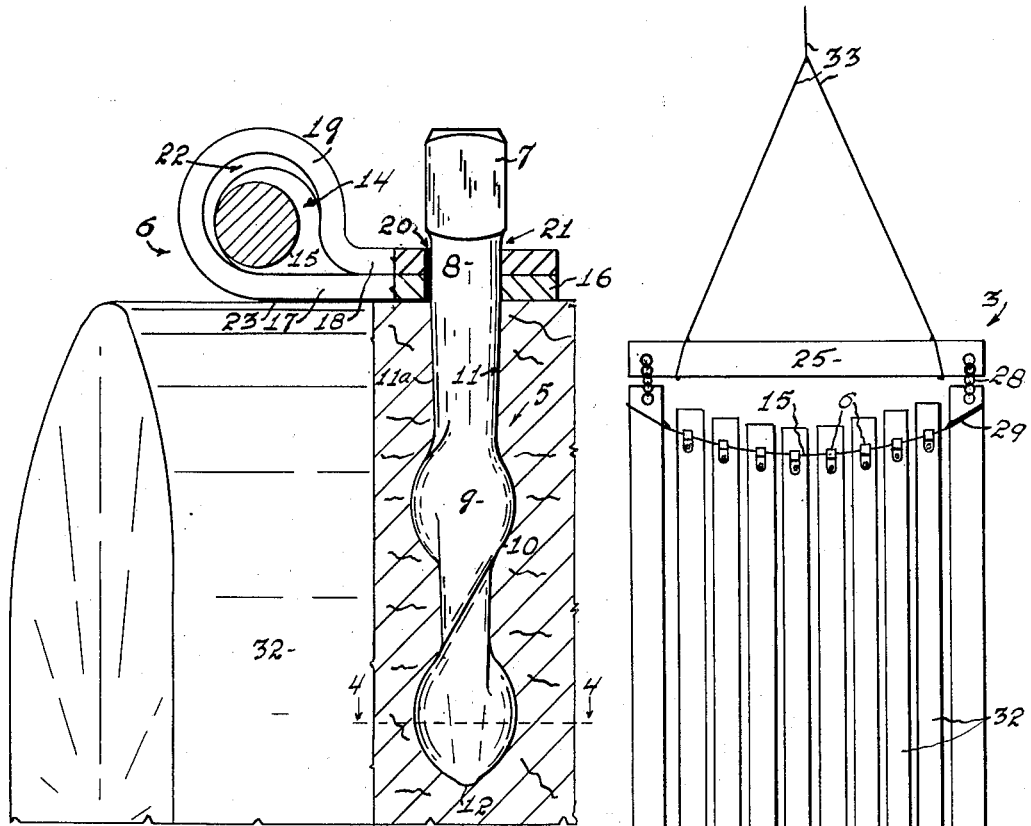
Figure 1 is a view in side elevation of a dog constructed with the above objects in view and now in actual use.
Figure 3:
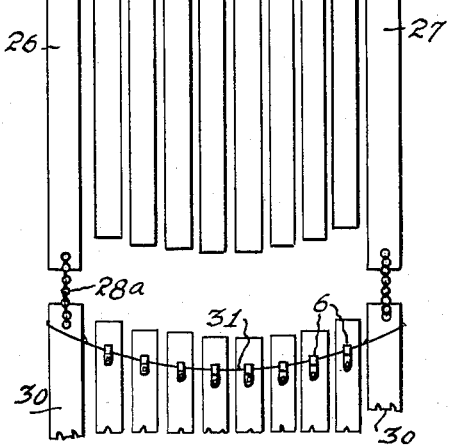
Figure 3 is a diagram or simple plan of a raft for carrying out one practical form of towing made possible by this invention.
Figure 2:
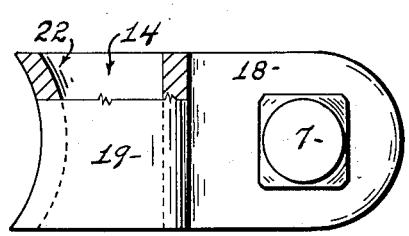
Figure 2 is a plan view thereof.
Figure 4:
Figure 4 is a cross section along line 4—4 of Fig. 1.

The dog, shown in position in a log in Figure 1 comprises a spike, generally indicated at 5 and a choke or eye member, which is generally indicated at 6. The spike comprises a squared head 7 to be engaged by a wrench (not shown) for removal, a neck 8 below the head, and a screw or twisted blade 9 at the lower part.

I have found that there are some very important considerations in the design of the screw or twisted blade 9 and that the practice here followed is quite unlike so called wood-screw or lag-screw, or like practice. First, in keeping with my discoveries, this screw is made by flattening the original stock of which the spike is made until it is shaped as a blade with reasonably acute outer edges 10; a total major diameter appreciably greater than the neck of the spike, but with greatly reduced thickness at its minor axis. Thus when the blade is twisted it provides the required strength and has full metal content and full cross sectional area. In making the twists the blade is twisted only slightly more than one full turn. The length is such, with this amount of twist, that the vertical pitch of the screw is quite steep so that the spike is adapted to be driven into the wood, nor indeed can it be screwed in the usual manner by reason of its steep pitch. Usual driving screws are unsuited to the strains which this screw is subjected to. Also usual driving screws have a heavy central section of round cross section which causes very appreciable displacement of the wood, and like any other so called screw, are intended primarily to resist axial stresses or straight-out pulling forces. In the present device the screw is nothing more or less than a flattened twisted blade arranged to penetrate wood with the minimum of displacement and with the minimum destruction of the fibre arrangement at the points where it enters.

It is well known that the usual wood-screws of either the driving type or the slight-pitch type with heavy round cross section, when subject to radial blows, readily break down the relatively thin layer of surrounding wood which holds them. In my improved screw the twisted blade construction tends to stand up very well under lateral blows and is in fact intended to resist same repeatedly without destruction of the adjacent wood-structure. Also the design of the entire dog is such that all towing strains are resolved into strains other than vertical.

By making the spike so that it can be driven in, but by having enough of the screw features to hold, the cost of applying the dog to a raft is reduced; the wood after removal is not noticeably harmed; the spike is at any later time quickly removed with a powerful wrench; and, the peculiar cross section of the screw is such as to cause the screw to be held partly by reason of the twist and partly by reason of the great compression which the adjacent wood is placed under to thereby promote great friction between the wood and the relatively great exposed area of the twisted blade.

In other words; while providing a spike that will withstand dislodgement by accident, the logger with usual strength and skill is capable of putting this dog in place and again removing it with relative ease, accuracy and low cost in time expended.

Immediately above the screw the neck of the spike is tapered so as to become surely and closely wedged in the wood when driven home as shown in the drawing, and to close the slight opening thru which the flattened blade previously passed, against the entrance of water. Also this taper tends to hold the spike more securely in place and particularly by reason of the fact that the margins of the cavity as at 11, are first made by the first entrance of a fairly sharp cutting instrument in the form of the sharp pointed end 12 of the screw. It is also pointed out in this connection that the twisted blade is best made merely by flattening the stock so that practically speaking the structure of the original steel is not greatly disturbed, and, the total circumferential measurement of the neck and the blade are about the same.

Revolubly fitted over the upper end of the neck is the choke which provides an eye 14 for a cable 15. This choke consists of a long involute band 16 comprising a lower horizontal extent 17, a loop 19, forming the eye 14, and an upper and shorter extent 18 overlying the lower extent. The loop is so disposed that its lower extremity is in line with the plane of the lower extent 17 so that the center of the eye is forwardly of and above the common plane of the two extents 17 and 18 respectively.

A hole 20 is drilled thru the two extents and thru this hole the spike is passed before its lower end is flattened and twisted. This hole allows the choke to turn freely about the neck of the spike. In driving the spike into a log there is a small space 21 left between the head of the spike and the choke to allow for slight but universal movement of the choke with regard to the spike.

The eye of the choke is flared at both ends as at 22; this to permit of readily feeding a cable thru; to allow slight motion with respect to cable; and more particularly to allow the log to roll slightly without the choke binding on the cable. The choke, by its design provides a large area horizontal surface 23 at the under side of the extent 17 and adjacent the log, and particularly is this surface brought in forceful contact with the log when the pull of the cable on the choke is straight outward or forward.

The raft 3 comprises three boom sticks 25, 26 and 27; one being transverse and the other two extending astern and towed directly by the transverse stick thru suitable flexible and strong instrumentalities, such as chains and the like at 28. The space between the two spaced towed boom sticks contains the logs making up the raft. The towed boom sticks are joined by a suitable slack cable; the one shown in Figure 1 as passing thru the eye of the choke of a dog, and in this way each log, having its own dog, is secured to the cable. The cable at each end as at 29 is suitably hitched to the corresponding boom stick. In this raft the boom sticks are no longer than the logs so that they will not tend to ride the forward ends of the logs out of water in a heavy sea.

Other boom sticks such as 30, 30 may be hitched as shown to the forward sticks to make up a raft of several trailing sections; each section having a cable such as the cable 31 for the second section to which logs may be secured in the same manner. A second section so towed tends to keep the first section with its logs, in suitable parallel relationship so that they do not spread out at the stern. In this way a great number of logs are towed in the form of a greatly elongated section raft rather than in the form of a wider raft. Also with a reasonable number of logs on each cable, a cable is not unduly stressed, and, in event of parting of lines or other connections or loss of raft sections, these sections tend to hold together and are easily salvaged.

Now under any condition whether the strain on the choke or eye of the dog be vertically upward, or downward and directly ahead or astern; the relative position of the center of the eye to the point where the choke is attached to the spike, is such that all forces which are transferred to the spike are resolved into forces radial to the axis of the spike. Thus all pull on the choke really tends to cause the spike to rock at the neck thereof; which neck becomes a fulcrum. The corresponding strains are imposed upon the twisted blade or screw; which by its nature is peculiarly suited to resist such strain. Also the pitch of the twist is such that under these strains the blade or screw will not tend to "work" in the wood and travel upwardly. No twists can be imposed on the spike by the choke even should there be times when the choke tends to rock and bind on the stem, since as explained, rolling action of the logs is permitted by the flare of the eye of the choke.

The type of dog illustrated having a diameter of the neck of one inch and other parts in the proportion shown has held a log of eight feet in diameter and 40 feet in length while same was being towed thru the Straits of San Juan de Fuca in one of its worst storms.

Now, I am aware of the fact that the three-boom-stick arrangement is not new but I am also aware that without the dog, and without having the boom sticks the same length practically as the logs, and again without having the raft made in sections with each section capable of movement with respect to others; this form of raft is not nearly so successful and economical.

Also I am aware of the fact that dogs, screwed (not driven) into logs to be towed, have been provided with forwardly directed loops or links tho not adapted to form connections with cables, and to distribute stresses in the manner peculiar to the device herein described; while the direction of pull so imposed upon dogs of the screwed type set up just a kind of strain that fine pitched screws are particularly incapable of withstanding without loosening.

It is understood of course that the descriptions herein have been specific as to construction and arrangement of parts and as to conditions of use, but only by way of making a very practical disclosure of a tried and proven device, and not with limitations thereby imposed upon the scope of this invention, and, it is understood that I may vary the construction and arrangement of parts and employ the devices described and modifications thereof, without enlarging the scope of invention and without departing from the spirit of the invention.

I claim:

1. In a raft of the class described, longitudinally extending parallel boom sticks, means holding said boom sticks in spaced relation, a cable secured to said boom sticks, logs in the space between said boom sticks, a choke and a spike for attaching each of said logs to said cable, said choke being formed of a metal band having a loop at one end for engagement with said cable and an opening at its other end to receive said spike for attachment to said log, said loop having a convex cable engaging portion.

2. The raft as in claim 1 and in which the plane of the loop is disposed above the plane of the spike-receiving end of said choke when the choke is in normal horizontal towing position.

3. The raft as in claim 1 and in which said spike comprises respectively a head above the opening, a neck below the head extending thru said opening, a tapered portion below said neck, and a two-edged flattened and subsequently twisted blade below said tapered portion adapted for being driven into wood to form an opening therein of not greater cross-sectional area than the minimum area of said tapered portion.

HILMER FRED BERG.